United States Patent [19]

Bennett

[11] Patent Number: 4,765,065
[45] Date of Patent: * Aug. 23, 1988

[54] TOOTH PROFILE SENSING INSTRUMENT

[76] Inventor: Therman B. Bennett, 1103 S. State Rte. 42, Lebanon, Ohio 45036

[ * ] Notice: The portion of the term of this patent subsequent to Nov. 10, 2004 has been disclaimed.

[21] Appl. No.: 118,274

[22] Filed: Nov. 6, 1987

Related U.S. Application Data

[63] Continuation of Ser. No. 835,365, Mar. 3, 1986, Pat. No. 4,704,802.

[51] Int. Cl.$^4$ .................................................. G01B 5/18
[52] U.S. Cl. ...................... 33/556; 33/172 R; 33/179.5 R; 33/199 R; 33/DIG. 1
[58] Field of Search ............. 33/556, 519, 199 R, 33/179.5 R, 172 R, 169 B, 169 R

[56] References Cited

U.S. PATENT DOCUMENTS

| 1,659,969 | 2/1928 | Baker | 33/172 R |
| 2,560,571 | 7/1951 | Hawkins | 33/172 R |
| 2,572,999 | 10/1951 | Elliott | 33/DIG. 1 |
| 3,911,586 | 10/1975 | Malonda | 33/172 R |
| 4,577,412 | 3/1986 | McKinney | 33/172 R |
| 4,704,802 | 11/1987 | Bennett | 33/556 |

Primary Examiner—William D. Martin, Jr.
Attorney, Agent, or Firm—Jacox & Meckstroth

[57] ABSTRACT

An instrument for sensing the profile of an elongate tooth of a corrugation roll or gear wheel or the like. A carriage supports an axially movable stem which is operably connected to an indicator element. The stem has an engagement portion which engages a tooth of a corrugation roll as the carriage is moved along the roll. The carriage is provided with runners or slide elements which travel within troughs or valleys, which separate the teeth of the corrugation roll. Preferably, a magnet member is attached to the carriage and is positioned adjacent the surface of the corrugation roll and maintains the position of the carriage with respect to the roll as the carriage is moved along the roll.

6 Claims, 1 Drawing Sheet

TOOTH PROFILE SENSING INSTRUMENT

RELATED APPLICATION

This application is a continuation of patent application Ser. No. 835,365, filed Mar. 3, 1986 now U.S. Pat. No. 4,704,802.

BACKGROUND OF THE INVENTION

Numerous devices and instruments have been devised for the purpose of determining the profile of teeth of a corrugation roll or gear wheel or the like. However, such instruments or devices have been of the type which merely measure distance between the top of a tooth and the bottom of a tooth of a corrugation roll. Such devices or instruments have not been readily capable of sensing the profile of teeth of a corrugation roll along the length thereof.

An object of this invention is to provide an instrument which is capable of sensing the profile of teeth of a corrugation roll along the length of the teeth.

Another object of this invention is to provide such an instrument which is relatively small in physical dimensions and which is easily moved along a tooth of a corrugation roll.

Another object of this invention is to provide such an instrument which is capable of a high degree of accuracy.

Another object of this invention is to provide such an instrument which firmly maintains its position with respect to a tooth as the instrument is moved along the tooth for sensing the condition thereof.

Other objects and advantages of this invention reside in the construction of parts, the combination thereof, the method of production and the mode of operation, as will become more apparent from the following description.

SUMMARY OF THE INVENTION

An instrument of this invention comprises a carriage or sled which has a pair of runners or slide elements. The runners or slide elements are adapted to be positioned within spaced-apart troughs or valleys. Each trough or valley separates a pair of adjacent teeth of a corrugation roll. The two runners or slide elements are positioned within two troughs or valleys, with one or more teeth between the two troughs or valleys.

The carriage or sled supports an axially movable stem which is substantially normal to the runners and which has an engagement element at the end thereof. The stem is supported within the carriage or sled, and the engagement element of the stem engages the upper surface of a tooth and is adapted to move along the tooth to sense the profile of the tooth as the stem moves upwardly and downwardly as the stem moves along the tooth. The stem is operably joined to an indicator element which is movable within a housing in accordance with axial movement of the stem.

Preferably, magnetic elements are mounted upon the sled or carriage and are adapted to be in juxtaposition with a tooth or teeth to firmly maintain the sled or carriage in proper position with respect to the teeth and valleys of the corrugation roll during movement of the sled and stem along a tooth.

DETAILED DESCRIPTION OF THE INVENTION

Figure 1:
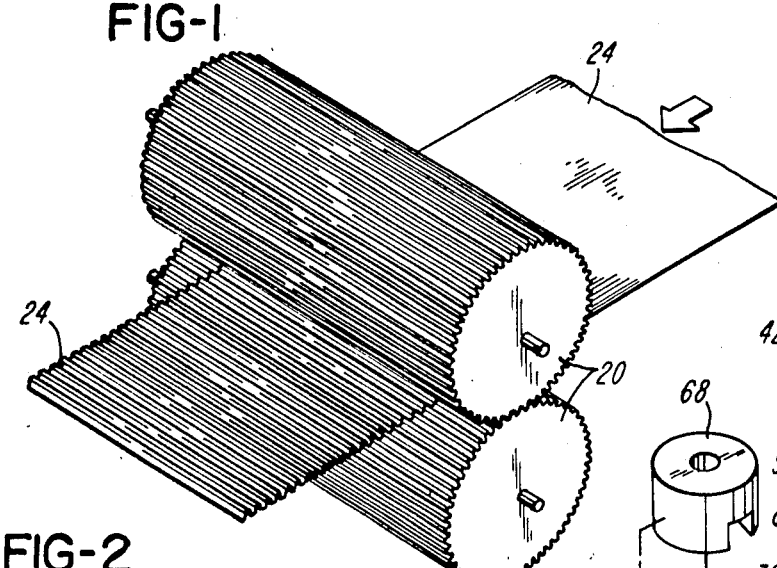
FIG. 1 is a perspective view showing a pair of corrugation rolls and illustrating the movement of a sheet between the rolls for corrugation thereof.

FIG. 1 shows a pair of closely spaced parallel corrugation rolls 20, as the rolls 20 rotate together and corrugate a sheet 24 which travels between the rolls 20. A tooth profile sensing instrument 30 of this invention comprises a carriage or sled 32 which is provided with slide elements or runners 34 at opposite sides thereof.

At the central portion of the sled 32 is an opening 36, within which a sleeve 38 is positioned. The sleeve 38 is generally cylindrical. The sleeve 38 has a flat surface 38f. The sleeve 38 has an opening 40 therethrough within which a collar 42 is mounted. The collar 42 has an annular peripheral groove 42g. A housing 46 is mounted upon the collar 42 and is attached thereto. A stem 48 axially extends through the collar 42 and is axially movable with respect to the collar 42 and with respect to the housing 46. Within the housing 46 is mechanism, not shown, which is connected to the stem 48 and to an indicator hand 50 which is rotatably mounted within the housing 46. The stem 48 has an engagement portion 48e at the end thereof.

The collar 42 is positioned within the opening 40 of the sleeve 38. Screws 54 are mounted within the sleeve 38 and extend into the groove 42g of the collar 42. Thus, the collar 42 is rotatable within the opening 40 of the sleeve 38, as the collar 42 is retained by the sleeve 38.

The sleeve 38 is positioned within the opening 36 in the sled 32, and a screw 58 which is mounted within the sled 32 engages the flat surface 38f of the sleeve 38 and retains the sleeve 38 within the sled 32.

The carriage or sled 32 also has a pair of openings 64. Within each opening 64 is a magnet 68. Set screws 70, mounted within the carriage 32, engage the magnets 68 and retain the magnets 68 within the openings 64.

OPERATION

Figure 2:
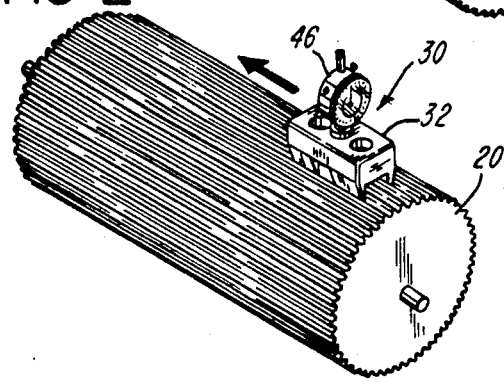
FIG. 2 is a perspective view showing one of the corrugation rolls and illustrating movement of an instrument of this invention along the roll to determine the profile of a tooth of the corrugation roll.
Figure 3:
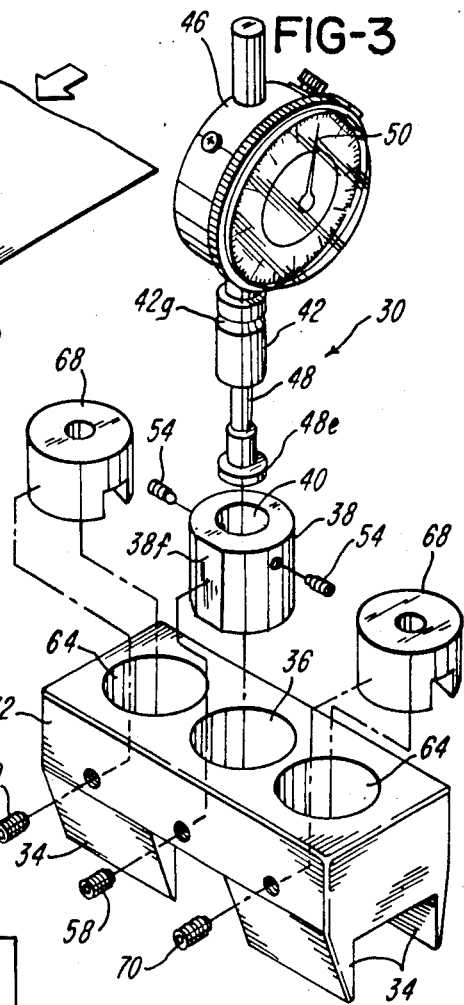
FIG. 3 is a greatly enlarged exploded perspective view showing a tooth profile sensing instrument of this invention.
Figure 5:
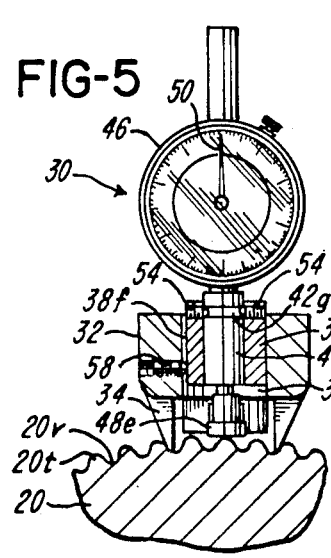
FIG. 5 is a sectional view taken substantially on line 5—5 of FIG. 4.
Figure 4:
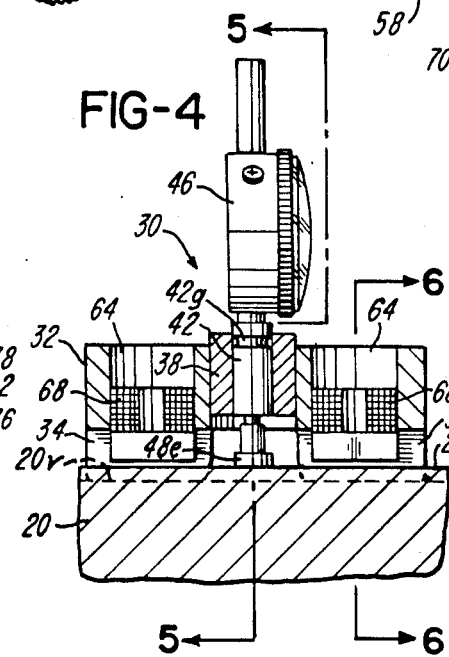
FIG. 4 is a side sectional view, drawn on substantially the same scale as FIG. 3 and showing a tooth engaged by the instrument for sensing the profile thereof.
Figure 6:
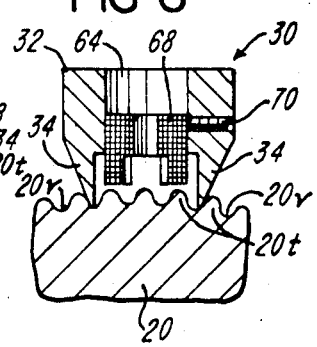
FIG. 6 is a sectional view taken substantially on line 6—6 of FIG. 4.

A tooth profile sensing instrument 30 of this invention is positioned upon a corrugation roll 20 as illustrated in FIG. 2. The corrugation roll is ordinarily constructed of any suitable metallic material. The slide elements or runners 34 of the sled 32 are positioned within troughs or valleys 20v of the roll 20. Each of the troughs or valleys 20v separates a pair of teeth 20t, as best illustrated in FIGS. 5 and 6. In the position of the carriage 32, shown in FIGS. 5 and 6 the engagement portion 48e of the stem 48 engages the upper surface of a tooth 20t. In this position of the carriage or sled 32, the magnets 68 are in juxtaposition with teeth 20t and are attracted to the surface of the corrugation roll 20 and urge the sled or carriage 32 toward the teeth 20t. Thus, the sled or carriage 32 is firmly maintained with respect to the teeth 20t and the corrugation roll 20.

Then the sled or carriage 32 is slidably moved along the troughs or valleys 20v, as illustrated in FIG. 2. As this sliding movement of the sled 32 occurs the engagement portion 48e of the stem 48 remains in engagement with the tooth 20t and the engagement portion 48e moves upwardly and downwardly in accordance with the profile of the tooth 20t engaged by the engagement portion 48e of the stem 48. As the engagement portion 48e moves upwardly and downwardly, as the carriage 32 moves along the corrugation roll 20, the stem 48 is moved axially upwardly and downwardly. Thus, the indicator hand 50 moves in accordance with the upward and downward movement of the engagement portion 48e of the stem 48. Therefore, an observer of the indicator hand 50 is able to determine the profile of the tooth 20t which is engaged by the engagement portion 48e of the stem 48.

As a result of the means by which the collar 42 is attached to the sleeve 38, the housing 46, with the collar 42, is rotatable and permits the housing 46 to be best rotatably positioned for observation of the indicator hand 50.

After the profile of a tooth 20t is observed, the sled or carriage 32 is moved to another position upon the corrugation roll 20 for sensing the profile of another tooth 20t.

Thus, it is understood that a tooth profile sensing instrument 30 of this invention provides means by which the profile of a tooth of a corrugation roll or gear wheel or the like can be easily and readily obtained.

Although the preferred embodiment of the tooth profile sensing instrument of this invention has been described, it will be understood that within the purview of this invention various changes may be made in the form, details, proportion and arrangement of parts, the combination thereof, and the mode of use, which generally stated consist in a tooth profile sensing instrument within the scope of the appended claims.

The invention having thus been described, the following is claimed:

1. A tooth profile sensing instrument for use with an elongate toothed corrugation roll provided with elongate teeth in which each tooth is formed by a pair of valleys, the corrugation roll being adapted to operate in meshed relationship with another corrugation roll, as the two corrugation rolls rotate and corrugate strip material which moves between the corrugation rolls, comprising:

a sled including a rigid body, a pair of spaced-apart elongate slide runners extending from the rigid body and establishing a pair of substantially parallel planes, the elongate slide runners being adapted to be positioned within spaced-apart valleys of a toothed corrugation roll, an annular member within the rigid body and positioned between the slide runners, a housing, means joining the housing to the annular member, a stem positioned within the annular member and extending through the annular member, the stem being substantially parallel to the planes of the slide runners, the stem being axially movable with respect to the annular member, the stem having an engagement portion engageable with a tooth of a toothed corrugation roll as the elongate slide runners are positioned within spaced-apart valleys of the toothed corrugation roll, an indicator member carried by the housing and operably joined to the stem for operation of the indicator member in accordance with axial movement of the stem, wherein the rigid body is movable along the elongate toothed corrugation roll as the elongate slide runners are slidably positioned within spaced-apart valleys of an elongate toothed corrugation roll and as the engagement portion of the stem engages a tooth which is positioned between the spaced-apart valleys and as the engagement portion of the stem slides along the tooth, as the profile of the tooth which is engaged by the engagement portion of the stem is sensed with axial movement of the stem, as indicated by the indicator member as the elongate slide runners of the rigid body slide within the valleys.

2. The tooth profile sensing instrument of claim 1 which includes means for mounting the annular member within the rigid body for rotation with respect to the rigid body.

3. A tooth profile sensing instrument for use with an elongate toothed corrugation roll provided with elongate teeth in which each tooth is formed by a pair of valleys, the corrugation roll being adapted to operate in meshed relationship with another corrugation roll, as the two corrugation rolls rotate and corrugate strip material which moves between the corrugation rolls, comprising:

a sled-type body including a pair of spaced-apart slide runners which establish a pair of substantially parallel planes, the slide runners being adapted to be positioned within spaced-apart valleys of a toothed corrugation roll, a stem positioned within the sled-type body between the slide runners and extending through the sled-type body, the stem being substantially parallel to the planes of the slide runners, means mounting the stem within the sled-type body for axial movement of the stem within the sled-type body, the stem being provided with an engagement portion engageable with a tooth of a toothed corrugation roll as the slide runners of the sled-type body are positioned within spaced-apart valleys of the toothed corrugation roll, an indicator member operably joined to the stem for operation of the indicator member in accordance with axial movement of the stem, wherein the sled-type body is movable along the elongate toothed corrugation roll as the slide runners are slidably positioned within spaced-apart valleys of the elongate toothed corrugation roll and as the engagement portion of the stem engages a tooth which is positioned between the spaced-apart valleys and as the engagement portion of the stem slides along the tooth, as the profile of the tooth which is engaged by the engagement portion of the stem is sensed with axial movement of the stem, as indicated by the indicator member as the slide runners of the sled-type body slide within the valleys.

4. The tooth profile sensing instrument of claim 3 which includes means mounting the indicator member for rotative movement about the axis of the stem and with respect to the sled-type body.

5. The tooth profile sensing instrument of claim 3 in which the elongate teeth of the corrugation roll are of magnetizable material, and in which the sensing instrument includes a magnet member attached to the rigid body between the slide runners and adapted to urge the sled-type body toward a tooth of the corrugation roll as the profile of the tooth is sensed by the instrument with operation of the indicator member.

6. A tooth profile sensing instrument for use with an elongate toothed corrugation roll provided with elongate teeth in which each tooth is formed by a pair of valleys, the corrugation roll being adapted to operate in meshed relationship with another corrugation roll, as the two corrugation rolls rotate and corrugate strip material which moves between the corrugation rolls, comprising:
- a sled-type body including a pair of spaced-apart elongate slide runners, the elongate slide runners establishing a pair of substantially parallel planes, the elongate slide runners being adapted to be positioned within spaced-apart valleys of a toothed corrugation roll,
- an annular sleeve within the sled-type body and positioned between the slide runners,
- means mounting the sleeve within the sled-type body,
- a stem, means mounting the stem for axial movement of the stem within the sleeve as the stem extends through the sleeve, the stem being substantially parallel to the planes of the slide runners, the stem having an engagement portion engageable with a tooth of a toothed corrugation roll as the elongate slide runners are positioned within spaced-apart valleys of the toothed corrugation roll,
- an indicator member operably joined to the stem for operation of the indicator member in accordance with axial movement of the stem,
- support means joining the indicator member to the sleeve,
- wherein the sled-type body is movable along the elonate toothed corrugation roll as the elongate slide runners are slidably positioned within spaced-apart valleys of an elongate toothed corrugation roll and as the engagement portion of the stem engages a tooth which is positioned between the spaced-apart valleys and as the engagement portion of the stem slides along the tooth, as the profile of the tooth which is engaged by the engagement portion of the stem is sensed with axial movement of the stem, as indicated by the indicator member as the elongate slide runners of the sled-type body slide within the valleys.

* * * * *